Sept. 23, 1952 F. M. GAGER ET AL 2,611,873

BRIDGE OSCILLATOR

Filed Feb. 24, 1950 2 SHEETS—SHEET 1

INVENTORS
FRANK M. GAGER
JAMES M. HEADRICK

BY D. B. Snyder and
W. Howard White ATTORNEYS

Sept. 23, 1952 F. M. GAGER ET AL 2,611,873

BRIDGE OSCILLATOR

Filed Feb. 24, 1950 2 SHEETS—SHEET 2

INVENTORS
FRANK M. GAGER
JAMES M. HEADRICK

BY D. O. Snyder and
Howard White III ATTORNEYS

Patented Sept. 23, 1952

2,611,873

UNITED STATES PATENT OFFICE 2,611,873

BRIDGE OSCILLATOR

Frank M. Gager, Hyattsville, Md., and James M. Headrick, Washington, D. C.

Application February 24, 1950, Serial No. 146,084

7 Claims. (Cl. 250—36)

Figure 1:
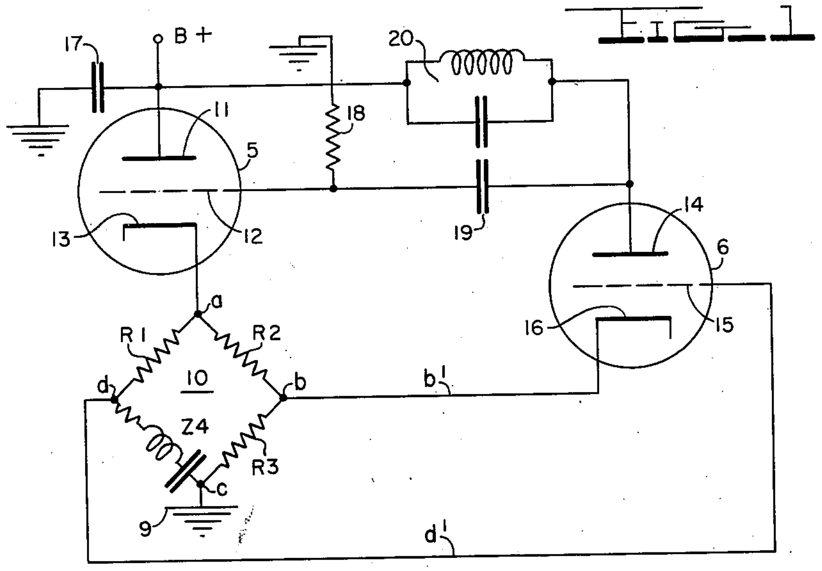

(Granted under the act of March 3, 1883, as amended April 30, 1928; 370 O. G. 757)

This invention relates in general to improvements in bridge-stabilized vacuum tube oscillators and in particular to a bridge stabilized oscillator which exhibits a dual feedback path without the need of input and output transformers.

In a known type of single-feedback path bridge-stabilized oscillator, such as shown by L. A. Meacham, Proceedings IRE, vol. 26, pages 1274 to 1294, October 1938, the circuit consists of an amplifier and an equivalent Wheatstone bridge. The amplifier output is impressed across one of the diagonals of the bridge through a tuned output transformer and the unbalancing potential appearing across the conjugate diagonal of the bridge is applied to the amplifier input terminals through another tuned input transformer. One of the four bridge arms is a thermally controlled resistance; two others are fixed resistances and the fourth is the equivalent series resistance of a crystal resonator utilized as the frequency controlling element. The best results from the standpoint of output frequency stability, may be derived by operating the resonator as nearly free of load as is possible and in the case of piezoelectric crystals with a low value of resonator current. This is accomplished by Meacham, supra, by employing two special transformers and high amplifier gain in conjunction with slight unbalance of the bridge, the higher the gain employed the less bridge unbalance required.

The primary disadvantage with a Meacham-type bridge-stabilized oscillator is the limitation imposed by the tuned input and output transformers, which are necessary to provide single-sided to double-sided (unbalanced to balanced) transformation. It has been found in practice that these transformers require special construction due to their criticalness in providing the proper phase-relationship between their input and output windings. Further, these transformers provide an undesirable operating frequency limitation since their inherent phase shift defect contributes to the feedback loop phase-shift and hence instability of the output frequency.

Another disadvantage found in the aforementioned bridge-stabilized oscillator is that the inherent low impedance of the bridge arm elements and the application of transformers or phase-splitter vacuum tubes necessarily dictate operation at a comparatively low frequency.

The present invention generally provides a bridge-stabilized oscillator eliminating the necessity of input and output transformers that is operable over a higher and wider frequency range. The necessary feedback loop phase-shift for the proper operation of the oscillator of the present invention, is obtained from the equivalent bridge and associated cathode follower device and by an additional vacuum tube means operating as an amplifier.

It is accordingly an object of the present invention to provide a new and improved bridge-stabilized vacuum tube oscillator.

It is a further object of the present invention to provide a new and improved bridge-stabilized oscillator which eliminates the necessity of the use of transformers for the single-sided to double-sided (unbalanced to balanced) conversions heretofore required in the feedback loop.

Another object of the present invention is to provide a new simplified and improved bridge-stabilized oscillator having its possible source of undesired phase-shift localized to one simple parallel resonant circuit.

Another object of the present invention is to provide a new and improved bridge-stabilized oscillator operable over a higher and wider range of frequencies.

Another object of the present invention is to provide a new and improved bridge-stabilized variable frequency oscillator.

Another object of the present invention is to provide a new and improved bridge-stabilized oscillator offering the advantages of a dual-feedback path.

Another object of the present invention is to provide a new and improved bridge-stabilized oscillator containing a minimum number of components.

Figure 2:
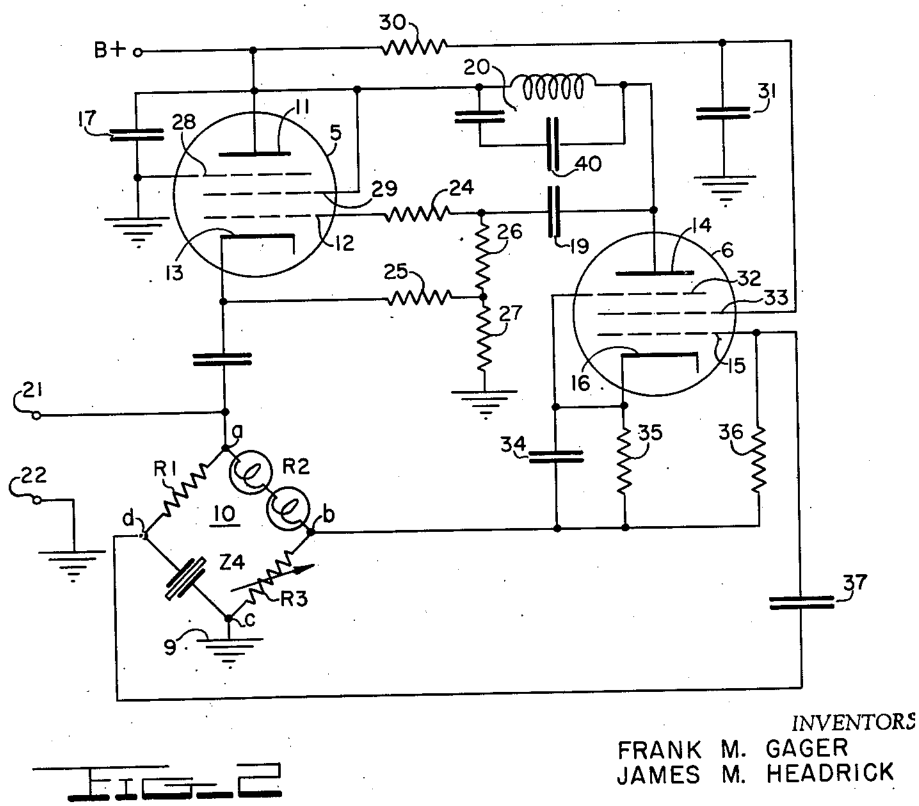
Figure 3:
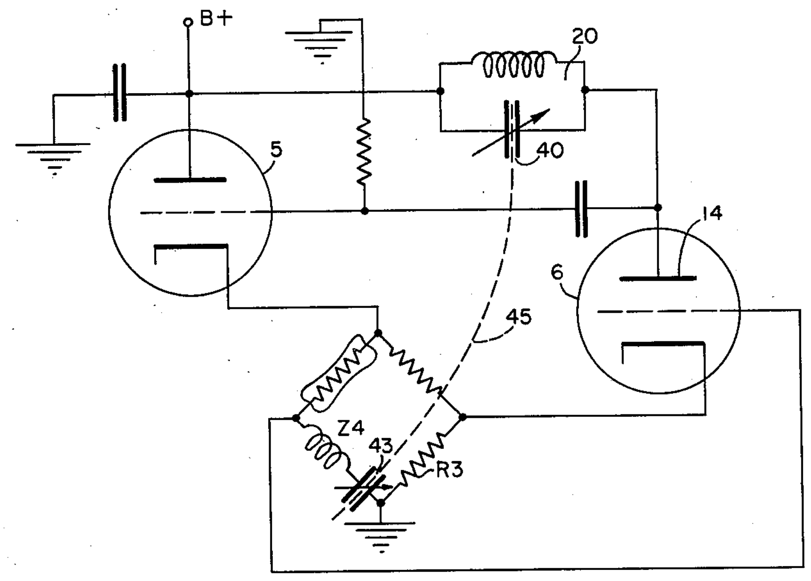
Figure 4:
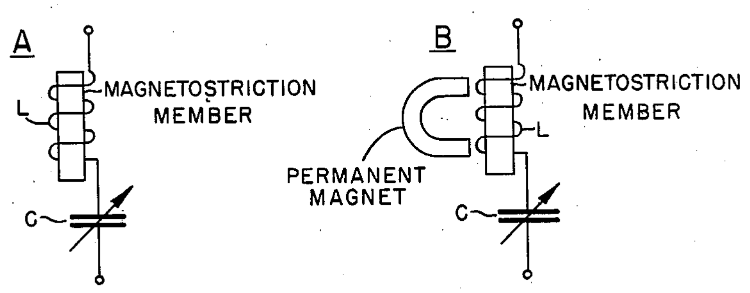

Other features and attainments of the present invention will become readily apparent from a careful consideration of the following detailed description when taken in conjunction with the drawings in which:

Figure 1 is a schematic diagram of a typical embodiment of a bridge-stabilized oscillator employing the features of the present invention, Figure 2 is a schematic diagram of a practical embodiment of a bridge-stabilized oscillator constructed in accordance with the teachings of the present invention, Figure 3 is an additional embodiment of the present invention illustrating a variable frequency bridge-stabilized oscillator, and Figure 4 shows two variations of the resonator element of Figure 1 employing a magnetostriction member.

In general, and in accordance with the spirit of the present invention, the bridge-stabilized oscillator is comprised essentially of an equivalent four terminal bridge and a pair of regeneratively connected vacuum tubes. The bridge constants are such that the system is near balance at the series resonant frequency of the frequency controlling element and the resistance value of one bridge element is current sensitive to provide amplitude stabilization of the generated oscillations. The first of the pair of vacuum tubes is a tuned plate loaded high gain amplifier having inherently a desirable 180° phase-shift per stage. The second of the pair of vacuum tubes is a cathode follower operable to provide the low impedance drive to the bridge. The grid and the cathode of the high gain amplifier are connected to the equivalent bridge so as to be approximately symmetrical about ground to obtain without the use of special transformers, the double-sided to single-sided conversion conventionally required from the output of the bridge to the input of the amplifier. It is this feature that introduces a second feedback path due to the cathode current of the amplifier, in its relation to the rest of the circuit, flowing through one arm of the bridge.

Referring now in particular to Figure 1, there is shown a representative oscillator circuit as taught by the present invention. The circuit consists principally of a near-balanced equivalent bridge 10, a high gain tuned vacuum tube amplifier circuit 6, and a cathode follower vacuum tube circuit 5.

The constants of the elements of the bridge 10 are chosen to maintain as nearly as possible an exact null balance between output *d* and *b* and input *a* and *c* as is consistent with maintaining sustained oscillations by slight off-balance operation i. e., slight output voltage from terminal *d* and *b*. Element $Z_4$ is the frequency controlling element, hereinafter discussed in more detail, whereas element $R_2$, having a positive temperature coefficient of resistance is current-sensitive in resistance value to automatically adjust attenuation from input to output of the bridge 10 to be equal to the reciprocal of the feedback loop gain. Attenuation, herein referred to, is defined as the loss in voltage between terminals *a* and *c* and terminals *d* and *b* of bridge 10. Gain is referred to as the increase in voltage through the amplifier 6 from terminals *d* and *b* to terminals *a* and *c* of bridge 10.

The equivalent series resistance, at resonance, of the high Q frequency controlling element $Z_4$, which is in one preferred embodiment a piezo-electric crystal; the resistances of bridge elements $R_1$ and $R_3$ and the resistance of the current-sensitive element $R_2$ comprise the near-balanced equivalent bridge circuit 10 between the input terminals *a* and *c* and the output terminals *b* and *d*. One means of achieving a slight unbalance in the equivalent bridge is by making resistive element $R_3$ a variable resistor. By slightly off-balancing the bridge element $R_3$, so that the ratio of $R_1$ to $Z_4$ exceeds slightly the ratio of $R_2$ to $R_3$, a small output voltage is obtained from the terminals *b* and *d* of the bridge 10. This voltage appearing at output terminals *b* and *d* of the bridge is applied through lines *b'* and *d'* to the cathode 16 and the grid electrode 15, respectively, of the high-gain vacuum tube circuit 6.

Vacuum tube circuit 6 is a high-gain amplifier operable to shift the voltage applied thereto 180°. The load impedance for amplifier vacuum tube 6 is supplied by a resonant circuit 20 in the anode 14 circuit. A tuned amplifier, using a single resonant circuit to provide the load impedance, has a response curve of amplification as a function of frequency that approximates the shape of an ordinary parallel resonant curve having an effective Q somewhat lower than the actual Q of the resonant circuit itself.

In a prior art adaption of the near-balanced bridge with conventional resonant amplifiers and associated input and output transformers, there is an inherent undesired loop phase-shift introduced that varies as the function of frequency. However, in the oscillator circuit of the present invention, through the elimination of the input and output transformers the undesired loop phase-shift through amplifier 6 and its associated circuit is substantially zero and the frequency of oscillation is controlled by element $Z_4$ alone, and this frequency is substantially independent of circuit changes due to temperature or variations in supply voltage. Vacuum tube 6 should have, however, a high Q tuned circuit, a large internal plate resistance and a large load impedance so that the bridge element resistances are small by comparison. Normally this requirement may be met in single- or multi-stage amplifiers by those skilled in the art.

The vacuum tube bias circuits are not exemplified in Figure 1 for purposes of simplicity. The grid 15 and cathode 16 of vacuum tube amplifier 6 are operated approximately symmetrical about ground or common terminal 9, through elements $Z_4$ and $R_3$ respectively, to obtain without the use of a transformer the double-sided to single-sided conversion required by the bridge-feedback network. It is this manner of coupling the near-balanced bridge to the high-gain amplifier that introduces a second feedback-path due to the plate current of amplifier circuit 6 flowing from cathode 16 back to the point *b* of bridge 10. For certain applications of this invention, the cathode 16 of vacuum tube 6 may have a separate bias resistor and the point *b* of bridge 10 may be connected to the junction between the added resistor and cathode 16 through a suitable condenser. It is of course understood that multi-stage tuned amplifiers may be incorporated in the system. The amplified output at the anode 14 of vacuum tube 6 is applied through coupling capacitor 19 to the grid 12 of vacuum tube 5.

Vacuum tube 5 and its associated circuit is employed in the present invention to drive the low impedance bridge 10. This is accomplished without the aid of a transformer by accordingly connecting vacuum tube 5 as a cathode follower with the low impedance bridge, as represented between points *a* and the ground or common terminal *c*, as its cathode load impedance. Alternatively the plate current of cathode follower vacuum tube 5 can flow through a separate cathode resistor and the bridge can be capacity-coupled from the cathode resistor and cathode junction to point *a*. Grid 12 of vacuum tube 5 is connected to ground through resistor 18 and anode 11 is connected directly to B+ and to condenser 17 acting as a bypass condenser to an R. F. ground.

If all the bridge arms had relatively fixed values of resistance, the operation of the oscillator would be very critical with slight changes. This is, of course, undesirable, for the circuit would either fail to oscillate or else it would build up in oscillation amplitude until tube overloading occurred and resonator current became accessive. In one arrangement of the circuit the value of one bridge element, such as resistor $R_2$, is made current-sensitive and thereby automatically adjusting attenuation through the bridge to be equal to the reciprocal of the feedback loop gain. This provides amplitude control of both the oscillation and resonator current. The bridge arm $R_2$ of Figure 1 has a large positive temperature coefficient of resistance and it is so designed that the portion of cathode-follower output which reaches it in the bridge circuit is great enough to raise its temperature and increase its resistance materially. In this manner a tendency to increase amplitude of oscillation causes less input voltage to the amplifier. In another embodiment of this invention a thermistor having a large negative temperature coefficient of resistance was employed in the position of resistor $R_1$. A small tungsten filament lamp, sometimes two in series, was also found suitable for temperature sensitive purposes as resistance $R_2$.

In operation, when power supply voltage is first applied to the oscillation system, current-sensitive element $R_2$ of Figure 1, is relatively cool and its resistance is considerably smaller than that required for the near-balance value. Thus, initially the attenuation of the bridge is relatively small with respect to that obtained at the desired near-balance condition and system oscillation can build up rapidly. As the current-sensitive element $R_2$ warms, its resistance approaches the desired value for which the voltage loss or attenuation between input and output of the bridge substantially equals the voltage gain of the feedback loop amplification. Thus, current-sensitive element $R_2$ is assumed to have a value that is a function of its conducting alternating current, but to change resistance slowly enough by thermal lag that its resistance value is substantially constant over any one cycle.

It should be noted that the effective crystal resonant series resistance and the value of the current-sensitive resistor change appreciably over a wide temperature range, requiring that some bridge arm be adjusted if oscillation level is kept constant over said temperature range. It was shown in practice that this adjustment may be performed with an appropriate ambient-temperature-sensitive resistor in one bridge arm. As an alternative, a rudimentary vacuum-tube voltmeter may be included with the oscillator and the oscillation level set to some predetermined value when large changes in ambient temperature are encountered.

The frequency controlling element, impedance $Z_4$, may be either a series resonant, fixed tuned L-C circuit or an electro-mechanical resonator, such as a piezo-electric crystal or magnetostriction member. It is preferable to operate an electro-mechanical resonator as a series resonant phenomena so as to utilize its low equivalent series resistance as one arm of the bridge. A magnetrostriction member can be coupled to the inductance of the aforementioned L-C circuit as illustrated, by way of example, in A and B of Figure 4. The magnetostriction member can receive magnetic bias due to D. C. current flowing therethrough, as shown in A; a fixed magnet associated with the magnetostriction member, as shown in B; or a combination of both.

In addition to the more than equivalency of the oscillator of the present invention over those of the prior art in frequency stability, the dual-feedback-path oscillator renders frequency stability independent of transconductance changes in the high-gain amplifier for small undesired phase-shifts different from zero.

An operable oscillator circuit constructed in accordance with the teachings of the present invention is illustrated in Figure 2. The circuit as shown employs a piezo-electric crystal $Z_4$ as the frequency controlling element. Two tungsten lamps served as the current-sensitive resistor $R_2$, and a thermistor in place of resistor $R_1$ was employed in an additional embodiment as hereinafter explained. The resistive bridge arm elements and their adjustment are chosen to allow low level current excitation of the crystal, a condition where the crystal is comparatively insensitive to frequency changes caused by amplitude of excitation. Resistive element $R_3$ is shown as a variable resistor to off-balance the bridge by manual variation thus providing the proper amplitude level of oscillation by controlling the attenuation between input and output of the bridge.

Vacuum tube 6 and its associated circuit is the high-gain amplifier, as previously described, having a resonant circuit 20 in the plate circuit 14; elements 34, 35 and 36 are in the cathode 16 and grid circuits 15 and 32 of the high-gain amplifier as illustrative of one manner in which grid bias was obtained. Anode 11 and grid element 29 of vacuum tube 5 are connected directly to the B+ terminal and condenser 17 provides plate supply by-pass to ground. The low-resistance bridge arm elements $R_1$, $R_2$, $R_3$ and resistance of $Z_4$ serve as the cathode load resistance of vacuum tube 5 between the points *a* and the ground or common terminal *c*.

With reference to Figure 3 there is illustrated a simplified embodiment of a variable frequency bridge-stabilized oscillator requiring no circuit modifications other than the necessary elements for the manual change of the frequency. The frequency controlling element $Z_4$ in this instance comprises an inductor and a tunable capacitor 43. The parallel tuned resonant circuit 20 in the plate circuit 14 of vacuum tube 6 comprises an inductor and a tunable capacitor 40. Dotted line 45 between capacitors 43 and 40 is for purposes of indicating that the tunable capacitors 43 and 40, are, or may be, ganged. Any means known to those skilled in the art of ganging a pair of capacitors or slug-tuned inductors or a combination for simultaneous tuning operation may be employed. In addition, when a wide range of frequency is desired a resistance arm of the bridge, such as $R_3$, may be ganged to the aforementioned tuning mechanism to adjust the required near-balance condition simultaneously. Varying the capacitance of capacitor 43 varies the frequency of the frequency controlling series resonant circuit $Z_4$. Varying capacitor 40 simultaneously with capacitor 43 adjusts the tuned amplifier load in accordance with the controlling frequency change. An oscillator constructed in accordance with, for example Figure 2, and incorporating the variable frequency feature shown in Figure 3 has proven to provide a highly stable variable frequency oscillator.

Although we have shown only certain and specific embodiments of the present invention, it is to be expressly understood that many modifications are possible thereof without departing from the true spirit of this invention.

The invention described herein may be manufactured and used by or for the Government of the United States of America for governmental purposes without the payment of any royalties thereon or therefor.

What is claimed is:

1. An oscillator circuit comprising a first and second thermionic discharge device each having an anode, a cathode and at least one grid electrode, a normally balanced impedance bridge comprising a plurality of serially-connected impedance elements forming a closed loop, means connecting two opposite vertexes of said bridge to the cathode and grid electrode of said first discharge device, means connecting the other two opposite vertexes of said bridge to the cathode of said second discharge device and to a point of common reference potential, a tuned resonant circuit in the anode circuit of said first discharge device, and coupling means connecting the anode of said first discharge device to the grid electrode of said second discharge device.

2. An oscillator circuit comprising a first and second thermionic discharge device each having an anode, a cathode and at least one grid electrode, a normally balanced impedance bridge comprising a plurality of serially-connected impedance elements forming a closed loop, means connecting two opposite vertexes of said bridge to the cathode and grid electrode of said first discharge device, means connecting the other two opposite vertexes of said bridge to the cathode of said second discharge device and to a point of common reference potential, one of said impedance elements positioned between the vertexes connecting said grid electrode and said point of common reference potential comprising a series resonant circuit, a parallel resonant circuit in the anode circuit of said first discharge device, and coupling means connecting the anode of the first discharge device to the grid electrode of said second discharge device.

3. An oscillator circuit comprising a first and second thermionic discharge device each having an anode, a cathode and at least one grid electrode, a normally balanced impedance bridge comprising a plurality of serially-connected impedance elements forming a closed loop, means connecting two opposite vertexes of said bridge to the cathode and grid electrode of said first discharge device, means connecting the other two opposite vertexes of said bridge to the cathode of said second discharge device and to a point of common reference potential, one of said impedance elements positioned between the vertex connecting said cathode of said second discharge device and the vertexes connecting said grid and cathode of said first discharge device comprising a current sensitive resistive element, a parallel resonant circuit in the anode circuit of said first discharge device, and coupling means connecting the anode of the first discharge device to the grid electrode of said second discharge device.

4. An oscillator circuit comprising a first and second thermionic discharge device each having at least an anode, a cathode and at least one grid electrode, a normally balanced impedance bridge comprising a plurality of serially-connected impedance elements forming a closed loop, means connecting two opposite vertexes of said bridge to the cathode and grid electrode of said first discharge device, means connecting the other two vertexes of said bridge to the cathode of said second discharge device and to a point of common reference potential, one of said impedance elements positioned between the vertexes connecting said grid electrode and said point of common reference potential comprising an inductive-capacitive series resonant circuit, one of said impedance elements positioned between the vertex connecting said cathode of said second discharge device and the vertexes connecting said grid and cathode of said first discharge device comprising a current-sensitive resistive element, an inductive-capacitive parallel resonant circuit in the anode circuit of said first discharge device, a source of B+ potential, means for connecting the anode of said second discharge device and said parallel resonant circuit to said source of B+ potential, and coupling means connecting the anode of the first discharge device to the grid electrode of said second discharge device.

5. An oscillator circuit comprising a first and second thermionic discharge device each having an anode, a cathode and at least one grid electrode, a normally balanced impedance bridge comprising a plurality of serially-connected impedance elements forming a closed loop, means connecting two opposite vertexes of said bridge to the cathode and grid electrode of said first discharge device, means connecting the other two opposite vertexes of said bridge to the cathode of said second discharge device and to a point of common reference potential, one of said impedance elements positioned between the vertexes connecting said grid electrode and said point of common reference potential comprising an inductive-capacitive series resonant circuit, an inductive-capacitive parallel resonant circuit in the anode circuit of said first discharge device, coupling means connecting the anode of the first discharge device to the grid electrode of said second discharge device, said capacitive element in said series resonant circuit in said bridge circuit and the capacitive element in said parallel resonant circuit in said anode circuit comprising a variable capacitor, and means for ganging said variable capacitors for simultaneously tuning to vary the frequency of said oscillator.

6. A vacuum tube oscillator comprising, a first electron discharge device having grid, cathode and anode electrodes, a four terminal bridge network connected to form a cathode load for said discharge device, and a regenerative feedback path including a high gain amplifier feeding the output from one pair of bridge diagonals back to the grid of said discharge device to promote oscillation.

7. A vacuum tube oscillator comprising, a first electron discharge device having grid, cathode and anode electrodes, a four terminal bridge network connected to form a cathode load for said discharge device, one leg of said bridge comprising a frequency sensitive impedance, and a regenerative feedback path including a tuned high gain amplifier feeding the output from one pair of bridge diagonals back to the grid of said discharge device to promote oscillation.

FRANK M. GAGER.
JAMES M. HEADRICK.

REFERENCES CITED

The following references are of record in the file of this patent:

UNITED STATES PATENTS

| Number | Name | Date |
|---|---|---|
| 2,066,027 | Braaten | Dec. 29, 1936 |
| 2,168,924 | Dow | Aug. 8, 1939 |
| 2,447,248 | Harris | Aug. 17, 1948 |
| 2,495,177 | Norde | Jan. 17, 1950 |